United States Patent
Klemanski et al.

(10) Patent No.: US 10,965,755 B2
(45) Date of Patent: Mar. 30, 2021

(54) COMMUNICATION SYSTEM AND METHOD

(71) Applicant: Westinghouse Air Brake Technologies Corporation, Wilmerding, PA (US)

(72) Inventors: Richard S. Klemanski, Walkersville, MD (US); Carl L. Haas, Walkersville, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 36 days.

(21) Appl. No.: 14/539,389

(22) Filed: Nov. 12, 2014

(65) Prior Publication Data

US 2016/0135154 A1 May 12, 2016

(51) Int. Cl.
  *H04L 12/00* (2006.01)
  *H04L 29/08* (2006.01)
  *H04W 4/40* (2018.01)
  *B61L 15/00* (2006.01)

(52) U.S. Cl.
  CPC .......... *H04L 67/12* (2013.01); *B61L 15/0027* (2013.01); *H04W 4/40* (2018.02)

(58) Field of Classification Search
  CPC ....... H04L 2012/40293; H04L 12/4633; H04L 45/741; H04L 12/40169; H04L 45/58; H04L 67/12; H04W 12/08; H04W 4/046; B61L 15/0027
  USPC .......................................... 370/252; 701/1, 2
  See application file for complete search history.

(56) References Cited

U.S. PATENT DOCUMENTS

| | | | |
|---|---|---|---|
| 5,420,883 A | 5/1995 | Swensen et al. | |
| 5,720,455 A * | 2/1998 | Kull | B60L 15/32 246/187 C |
| 7,593,811 B2 | 9/2009 | Schmidt et al. | |
| 7,983,805 B2 | 7/2011 | Bryant | |
| 2003/0214417 A1 | 11/2003 | Peltz et al. | |
| 2005/0117571 A1* | 6/2005 | Dyke | H04J 3/02 370/355 |

(Continued)

OTHER PUBLICATIONS

Brazilian Office Action for application BR112016022826-0 dated Apr. 22, 2020.

(Continued)

*Primary Examiner* — Noel R Beharry
*Assistant Examiner* — Lionel Preval
(74) *Attorney, Agent, or Firm* — Mary D. Lawlor; The Small Patent Law Group LLC

(57) ABSTRACT

A communication system for a train having a lead locomotive power group and at least one remote locomotive power group, the system including: a lead locomotive computer in communication with a first and second lead communication device and programmed to: generate a command message; transmit or cause the transmission of the command message from the first lead communication device in a predetermined time slot; and transmit or cause the transmission of the command message from the second lead communication device in a different predetermined time slot; and at least one remote locomotive computer in communication with at least one remote communication device and programmed to directly or indirectly receive the command message from the first lead communication device and/or the second lead communication device. A communication method for a train is also disclosed.

30 Claims, 4 Drawing Sheets

(56) References Cited

U.S. PATENT DOCUMENTS

| | | | |
|---|---|---|---|
| 2006/0085103 A1* | 4/2006 | Smith | B61L 15/0027 |
| | | | 701/19 |
| 2006/0098660 A1* | 5/2006 | Pal | H04J 3/085 |
| | | | 370/395.51 |
| 2006/0256768 A1* | 11/2006 | Chan | H04L 1/08 |
| | | | 709/238 |
| 2009/0016366 A1* | 1/2009 | Endo | H04L 45/00 |
| | | | 370/401 |
| 2010/0029209 A1* | 2/2010 | Daum | B61L 15/0027 |
| | | | 455/59 |
| 2010/0130124 A1* | 5/2010 | Teeter | B61L 15/0027 |
| | | | 455/15 |
| 2011/0183605 A1 | 7/2011 | Smith, Jr. et al. | |
| 2013/0151032 A1* | 6/2013 | Kraeling | H04L 45/74 |
| | | | 701/1 |
| 2014/0153412 A1* | 6/2014 | Luecke | H04L 12/28 |
| | | | 370/252 |
| 2015/0375764 A1* | 12/2015 | Rajendran | B61L 15/0027 |
| | | | 701/2 |
| 2016/0107661 A1* | 4/2016 | Cooper | B61L 15/0027 |
| | | | 246/167 R |

OTHER PUBLICATIONS

Australian Examination Report dated Jun. 17, 2020 for corresponding application No. AU2015347305. (4 pages).

* cited by examiner

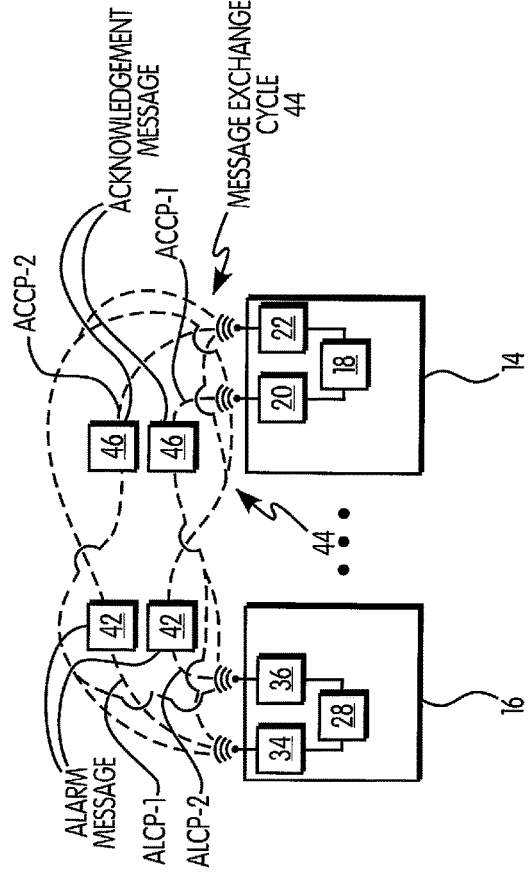
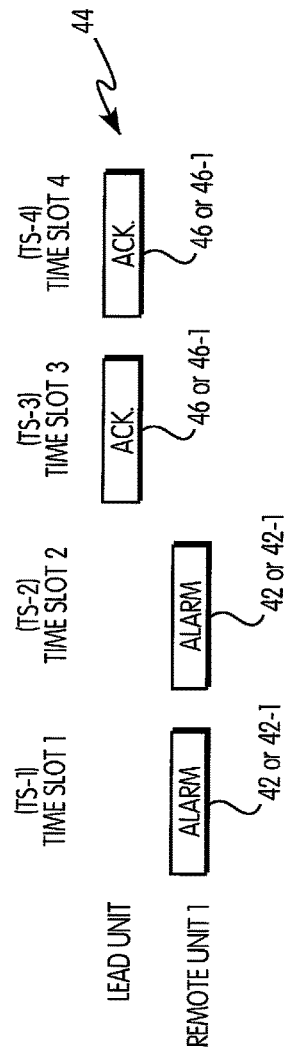
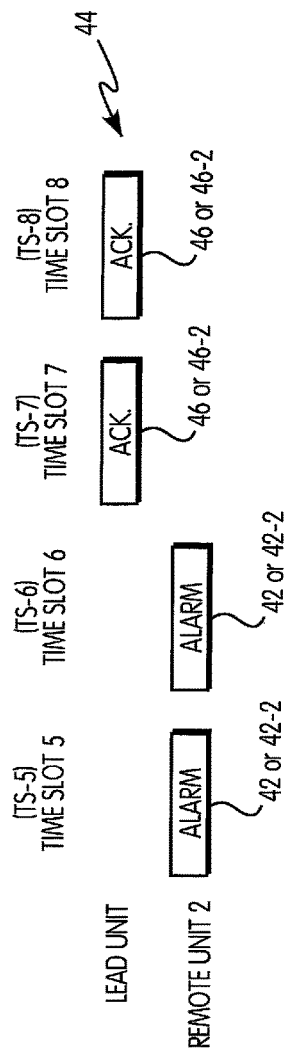

COMMUNICATION SYSTEM AND METHOD

BACKGROUND OF THE INVENTION

Field of the Invention

This invention relates generally to vehicle systems and networks, such as railway systems including trains travelling in a track or rail network, and in particular to a communication system and method for a train having a lead locomotive power group including at least one locomotive unit and at least one remote locomotive power group including at least one locomotive unit.

Description of Related Art

Vehicle systems and networks exist throughout the world, and, at any point in time, a multitude of vehicles, such as cars, trucks, buses, trains, and the like, are travelling throughout the system and network. With specific reference to trains travelling in a track network, the locomotives of such trains are typically equipped with or operated using train control, communication, and management systems (e.g., positive train control systems), such as the I-ETMS® of Wabtec Corp. In order to effectively manage all of the trains, information and data must be communicated and distributed over the network between the trains, i.e., the locomotives, a central control system, i.e., central dispatch, and various wayside devices, e.g., wayside interface units, radios, track communication devices, and other equipment positioned throughout the track network.

Further, and as is known, distributed power systems and arrangements are used in connection with certain trains, where these distributed power systems and arrangements include a lead locomotive power group having at least one lead unit (and/or at least one locomotive, at least one locomotive unit, and/or the like) and at least one remote power group having at least one remote unit (and/or at least one locomotive, at least one locomotive, and/or the like). In order to effect communication between the lead locomotive power group and the remote locomotive power group, a communication system and arrangement is used, typically based upon radio communications between groups and/or units. In particular, messages, such as command messages, response messages, alarm messages, acknowledgement messages, and/or the like are transmitted between the lead locomotive power group, i.e., at least one locomotive in the group, and the remote locomotive power group, i.e., at least one locomotive in the group, normally using known transceiver units, radio systems, communication systems, and/or the like. These messages and the communication protocol enable remote control of one locomotive power group by another locomotive power group (typically the lead locomotive power group controlling the remote locomotive power groups).

In one known application, the locomotive that is configured or identified as the lead unit will issue command messages over a radio communication path to the remote locomotive power groups, and a locomotive that is configured or identified as a remote unit will issues reply or response messages to the lead unit in response to receiving the command messages. Additionally, a remote locomotive power group may generate alarm messages to the lead unit asynchronously, which requires an acknowledgement (of receipt) message from the lead unit. The messaging or communication protocol that can be used in such applications is based on a Time Division Multiple Access (TMDA) implementation, where each locomotive power group is assigned a specific time slot in the message exchange cycle. In this known application, the lead unit is considered the "master" in the message exchange, and will initiate the normal communications (e.g., command messages) when required. The remote units will issue their replies (e.g., response messages) in the proper time slot, as determined by their position in the train.

With continued reference to this known application and arrangement, the communication system utilizes redundant radio transceivers to account for possible component failure or communication interruption on one transceiver. Specifically, when a lead unit transmits a message to a remote unit, the message will be sent from one of the two radio transceivers. The lead unit will then wait for period of time to receive an acknowledgement from the remote unit. If the acknowledgement is not received in the allotted amount of time, the lead unit will re-issue the command using the same transceiver. This message issuance cycle will continue for a specific number of times. If communications are still not reestablished after the retry count is exhausted, the lead unit will switch to the alternate radio transceiver and re-issue the command message. If communication to the remote unit is then re-established, the lead unit will continue to use this "operable" transceiver as the primary radio transceiver until another communications interrupt occurs. At that point, the same retry/radio transceiver swap cycle will be attempted. In the event that communication is not re-established, retries and radio transceiver swapping will continue. Using this switching/swapping methodology and process, it is possible to re-establish communications that were interrupted for reasons of either a failed transceiver, or, more commonly, an interruption of radio frequency signal path (e.g., due to terrain or other obstruction). With current message timing, it can take up to 20 seconds to swap to the alternate radio transceiver.

While the above-discussed switching/swapping methodology and process facilitate the effective management of message exchange in a distributed power train system, there is room in the field of train communication and management for improved communication systems and methods for trains (particularly distributed power trains, train consists, train systems, and/or the like)

SUMMARY OF THE INVENTION

Generally, provided are an improved communication system and computer-implemented communication method for a train travelling in a track network. Preferably, provided are an improved communication system and computer-implemented communication method for a distributed power train having a lead locomotive power group and at least one remote locomotive power group. Preferably, provided are an improved communication system and computer-implemented communication method for a train that facilitate an effective message exchange between a lead unit and at least one remote unit. Preferably, provided are an improved communication system and computer-implemented communication method for a train that facilitate an effective message exchange between a lead unit and at least one remote unit when a communication device fails or the signal path is interrupted. Preferably, provided are an improved communication system and computer-implemented communication method for a train that facilitate the identification of a defective or failed communication device or interrupted signal path. Preferably, provided are an improved communication system and computer-implemented communication method for a train that facilitate efficient and effective communications between locomotives in a variety of environments and applications.

According to one preferred and non-limiting embodiment or aspect, provided is a communication system for a train having a lead locomotive power group including at least one locomotive and at least one remote locomotive power group including at least one locomotive. The system includes a lead locomotive computer associated with the lead locomotive power group and in communication with a first lead communication device and a second lead communication device, and the lead locomotive computer is programmed or configured to: (i) generate at least one command message; (ii) transmit or cause the transmission of the at least one command message from the first lead communication device in a predetermined time slot in a message exchange cycle; and (iii) transmit or cause the transmission of the at least one command message from the second lead communication device in a predetermined time slot in the message exchange cycle different than the predetermined time slot in the message exchange cycle of the transmission in step (ii). The system further includes at least one remote locomotive computer associated with the at least one remote locomotive power group and in communication with at least one remote communication device, wherein the at least one remote locomotive computer is programmed or configured to directly or indirectly receive the at least one command message from at least one of the first lead communication device and the second lead communication device via the at least one remote communication device.

According to a further preferred and non-limiting embodiment or aspect, provided is a computer-implemented communication method for a train having a lead locomotive power group including at least one locomotive with a lead locomotive computer in communication with a first lead communication device and a second lead communication device, and at least one remote locomotive power group including at least one locomotive with at least one remote locomotive computer in communication with at least one remote communication device. The method includes: (i) generating, by the lead management computer, at least one command message; (ii) transmitting, or causing the transmission, by the lead management computer, of the at least one command message from the first lead communication device in a predetermined time slot in a message exchange cycle; (iii) transmitting, or causing the transmission, by the lead management computer, of the at least one command message from the second lead communication device in a predetermined time slot in the message exchange cycle different than the predetermined time slot in the message exchange cycle of the transmission in step (ii); and (iv) directly or indirectly receiving the at least one command message by the at least one remote locomotive computer from at least one of the first lead communication device and the second lead communication device via the at least one remote communication device.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 5 is a schematic view of a further embodiment or aspect of a communication system for a train according to the principles of the present invention;

FIG. 6 is a TMDA chart illustrating a further embodiment or aspect of a communication method for a train according to the principles of the present invention; and FIG. 7 is a TMDA chart illustrating a still further embodiment or aspect of a communication method for a train according to the principles of the present invention.

DETAILED DESCRIPTION OF THE PREFERRED EMBODIMENTS OR ASPECTS

Figure 1:
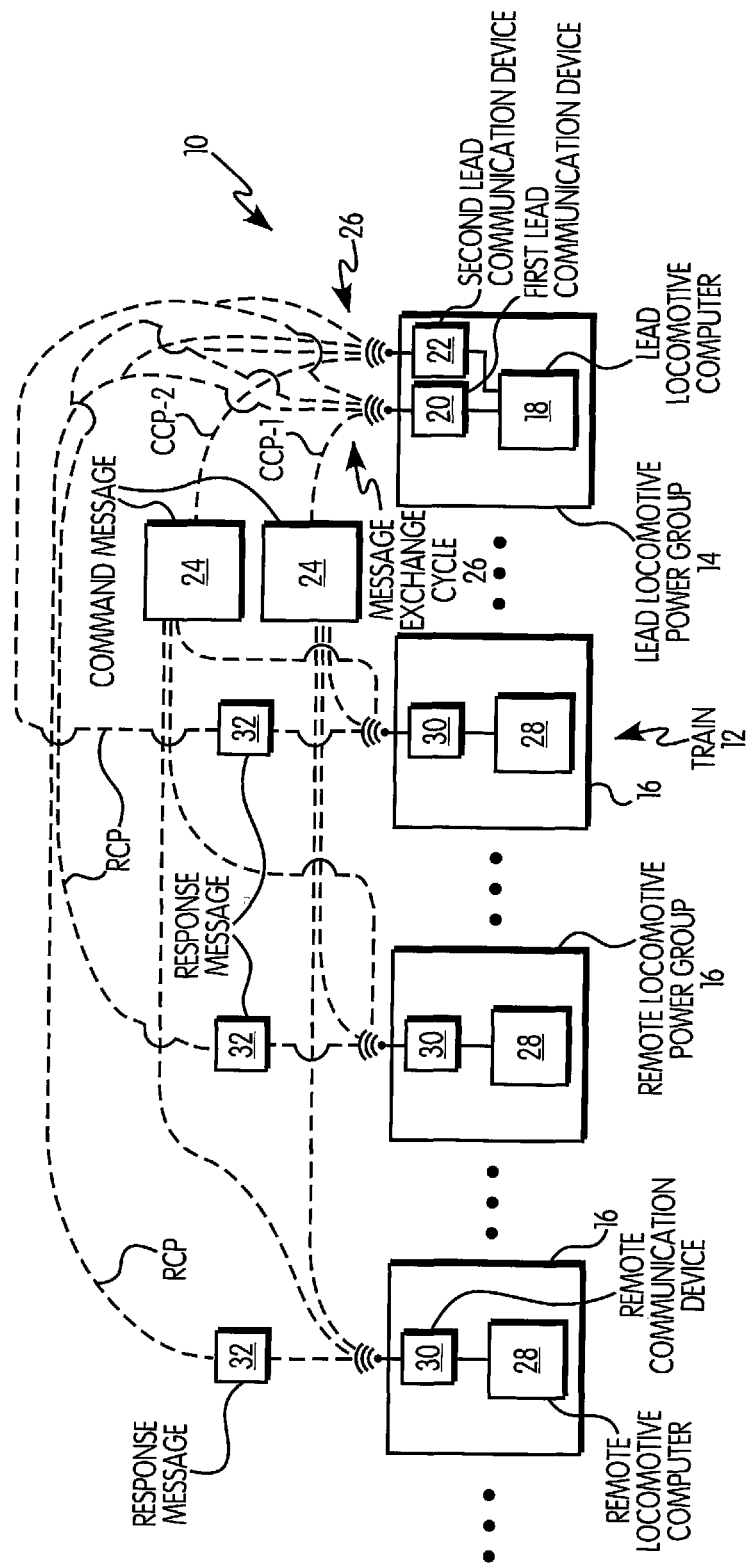
FIG. 1 is a schematic view of one embodiment or aspect of a communication system for a train according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a track)) between two units, such as two locomotive units or locomotive power groups. In one preferred and non-limiting embodiment, the "communication device" is a radio transceiver programmed, configured, or adapted to wirelessly transmit and receive radio frequency signals and data over a radio signal communication path.

The communication system and computer-implemented communication method described and claimed herein may be implemented in a variety of systems and vehicular networks; however, the systems and methods described herein are particularly useful in connection with a railway system and network. Accordingly, the presently-invented methods and systems can be implemented in various known train control and management systems, e.g., the I-ETMS® of Wabtec Corp. Accordingly, and in one preferred and non-limiting embodiment or aspect, the system architecture used to support the functionality of at least some of the methods and systems described herein includes a computer, such as or including a train management computer or on-board computer, and/or a computer or processing device that performs calculations for or within the Positive Train Control (PTC) system, a communication device or data radio (which may be used to facilitate the communications between the train management computers (and/or a separate computer or processing device) in one or more of the locomotives of a train, a track database (which includes information about track positions or locations, switch locations, track heading changes, e.g., curves, distance measurements, train information, e.g., the number of locomotives, the number of cars, the total length of the train, and the like), and a navigation system (optionally including Global Positioning System (GPS) and a wheel tachometer/speed sensor.

The present invention is directed to a communication system (or arrangement) 10 and computer-implemented method for a train 12, as illustrated in certain preferred and non-limiting embodiments or aspects in FIGS. 1-7. In particular, with reference to FIG. 1, and in one preferred and non-limiting embodiment or aspect, the communication system 10 is used in connection with a train 12 operating in a railway system. In this embodiment or aspect, the train 12 is operating with multiple locomotives (or locomotive units) in a distributed power arrangement. In particular, the train 12 includes a lead locomotive power group 14 (which includes one or more locomotives, one of which is considered the lead locomotive (or lead unit)) and at least one remote locomotive power group 16 (which includes one or more locomotives, which are considered remote units) positioned remotely from the lead locomotive power group 14 in the train 12. In another preferred and non-limiting embodiment or aspect, the train 12 includes multiple remote locomotive power groups 16, which may be required based upon the length of the train 12.

Figure 2:
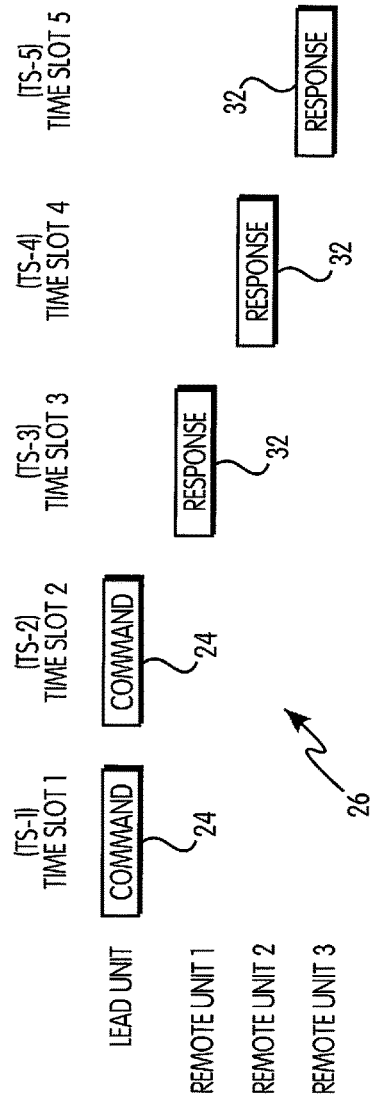
FIG. 2 is a TMDA chart illustrating one embodiment or aspect of a communication method for a train according to the principles of the present invention.

With continued reference to FIG. 1, the lead locomotive power group 14, such as the lead unit in the lead locomotive power group 14, includes at least one lead locomotive computer 18 (e.g., a train management computer, a separate computer, an on-board controller, a lead unit computer, a processing device, and/or the like) is in direct or indirect communication with a first lead communication device 20 and a second lead communication device 22. The first lead communication device 20 and/or the second lead communication device 22 may be in the form of an on-board radio unit, a transceiver, a wireless communication device, a wired communication device (e.g., a device that transmits over the rails of the track), and/or the like. In this embodiment or aspect, and as illustrated in FIG. 2 (which represents a Time Division Multiple Access (TMDA) chart), the lead locomotive computer 18 is programmed, configured, or adapted to: (i) generate at least one command message 24 (i.e., a data signal including content relating to the control of some operating aspect of the train 12); (ii) transmit or cause the transmission of the at least one command message 24 from the first lead communication device 20 in a predetermined time slot (e.g., over a communication path (CCP-1)) in a message exchange cycle 26; and (iii) transmit or cause the transmission of the at least one command message 24 from the second lead communication device 22 in a predetermined time slot (e.g., over a communication path (CCP-2) in the message exchange cycle 26 different than the predetermined time slot in the message exchange cycle 26 of the transmission in step (ii).

The communication system 10 further includes at least one remote locomotive computer 28 (e.g., a computer, an on-board controller, a lead unit computer, and/or the like) associated with the at least one remote locomotive power group 16, such as a remote locomotive or remote unit, and the remote locomotive computer 28 is in direct or indirect communication with at least one remote communication device 30, which may be in the form of an on-board radio unit, a transceiver, a wireless communication device, a wired communication device (e.g., a device that transmits over the rails of the track), and/or the like. In addition, the remote locomotive computer 28 is programmed, configured, or adapted to directly or indirectly receive the at least one command message 24 from the first lead communication device 20 (over the communication path (CPC-1)) and/or the second lead communication device 22 (over the communication path (CPC-2)) via the remote communication device 30. Accordingly, the same command message 24 is transmitted from the lead locomotive power group 14 (i.e., from each of the first lead communication device 20 and the second lead communication device 22) in two different time slots, such as from the first lead communication device 20 in a first time slot (TS-1) and the second lead communication device 22 in a second time slot (TS-2). This dual, redundant command message transmission approach ensures that the remote locomotive power group 16 will receive the command message 24 from the lead locomotive power group 14. Of course, additional lead communication devices (e.g., a third lead communication device, a fourth lead communication device, and so on) can be utilized to provide even greater redundancy benefits.

In another preferred and non-limiting embodiment or aspect, the remote locomotive computer 28 is programmed, configured, or adapted to: generate at least one response message 32 (i.e., a data signal including content relating to an indication that the command message 24 was received and/or implemented); and transmit or cause the transmission of the response message 32 from the remote communication device 30 (e.g., in a third time slot (TS-3) over a communication path (RCP)) in the message exchange cycle 26. This response message 32 is transmitted from each remote locomotive power group 16, such as from one of the remote locomotives or units in the remote locomotive power group 16. In this embodiment or aspect, the lead locomotive computer 18 is programmed, configured, or adapted to directly or indirectly receive the response message 32 from the remote communication device 30 via the first lead communication device 20 and/or the second lead communication device 22. As seen in FIG. 2, a response message 32 is transmitted from: a first remote locomotive power group 16 (e.g., remote unit 1) over the communication path (RCP)

in a third time slot (TS-3); a second remote locomotive power group 16 (e.g., remote unit 2) over the communication path (RCP) in a fourth time slot (TS-4); and a third remote locomotive power group 16 (e.g., remote unit 3) over the communication path (RCP) in a fifth time slot.

In another preferred and non-limiting embodiment or aspect, the command message 24 includes train control data and lead identification data, which at least partially represents an identification of the first lead communication device 20 or the second lead communication device 22. Further, the response message 32 from each remote locomotive power group 16 includes identification data based at least in part on the lead identification data, and at least partially representing an identification of the lead communication device (20, 22) from which the command message 24 was received. In this manner, the lead locomotive computer 18 and/or the remote locomotive computer 28 can use the lead identification data in the command message 24 and/or the identification data in the response message 32 to identify whether and which lead communication device (20, 22) is actively transmitting data, is potentially inactive, has potentially failed, and/or the like. This same assessment may occur using information related to which communication device (20, 22, 30) is or should be transmitting in which time slot (TS-1-TS-5).

Figure 3:
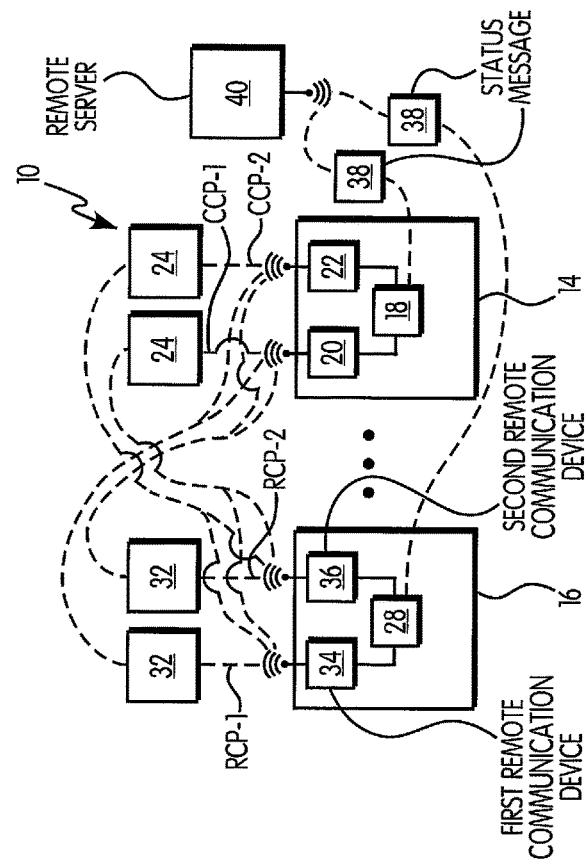
FIG. 3 is a schematic view of another embodiment or aspect of a communication system for a train according to the principles of the present invention.

With reference to FIG. 3, and in another preferred and non-limiting embodiment or aspect, the system 10 includes a first remote communication device 34 and a second remote communication device 36, and the remote locomotive computer 28 is programmed, configured, or adapted to: (a) transmit or cause the transmission of the response message 32 from the first remote communication device 34 over communication path (RCP-1) in a predetermined time slot (e.g., time slot (TS-3)) in the message exchange cycle 26 different than the predetermined time slots (e.g., time slot (TS-1) and time slot (TS-2)) in the message exchange cycles 26 of the transmissions from the lead locomotive power group 14; and (b) transmit or cause the transmission of the response message 32 from the second remote communication device 36 over communication path (RCP-2) in a predetermined time slot (e.g., time slot (TS-4)) in the message exchange cycle 26 different than the predetermined time slots (e.g., time slot (TS-1), time slot (TS-2), and time slot (TS-3)) in the message exchange cycles 26 of the transmissions from the lead locomotive power group 14 and the transmissions in step (a). This dual, redundant response message transmission process ensures that the lead locomotive power group 14 will receive the response message 32 from each remote locomotive power group 16. Additional remote communication devices (e.g., a third remote communication device, a fourth remote communication device, and so on) can be utilized to provide even greater redundancy benefits.

Figure 4A:
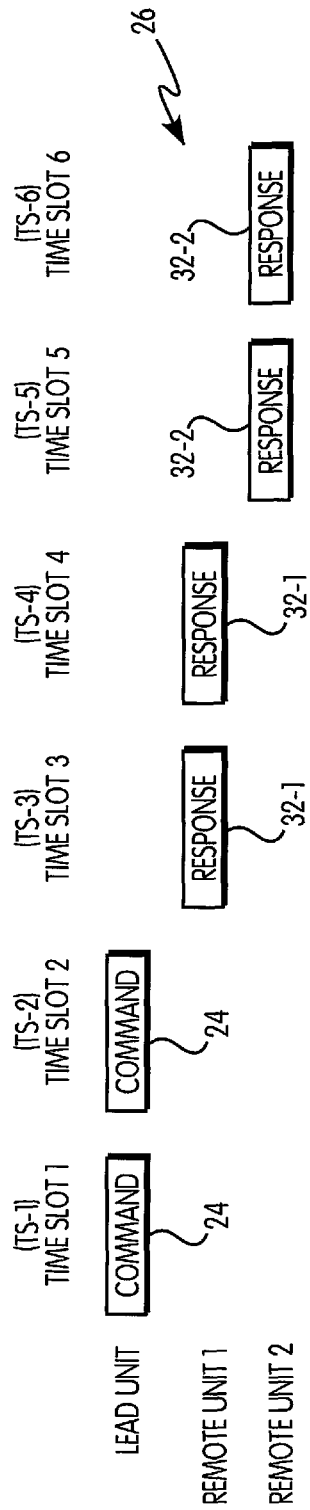
FIG. 4A is a TMDA chart illustrating another embodiment or aspect of a communication method for a train according to the principles of the present invention.

As illustrated in the TMDA chart in FIG. 4A, and in another preferred and non-limiting embodiment or aspect implemented in connection with two remote locomotive power groups 16, the message exchange cycle 26 is as follows: (1) the first lead communication device 20 of the lead locomotive power group 14 transmits the command message 24 over the communication path (CCP-1) in the first time slot (TS-1); (2) the second lead communication device 22 of the lead locomotive power group 14 transmits the command message 24 over the communication path (CCP-2) in the second time slot (TS-2); (3) the first remote communication device 34 of the first remote locomotive power group 16 transmits its response message 32-1 over the communication path (RCP-1) in the third time slot (TS-3); (4) the second remote communication device 36 of the first remote locomotive power group 16 transmits the response message 32-1 over the communication path (RCP-2) in the fourth time slot (TS-4); (5) the first remote communication device 34 of the second remote locomotive power group 16 transmits its response message 32-2 over the communication path (RCP) in the fifth time slot (TS-5); and (4) the second remote communication device 36 of the second remote locomotive power group 16 transmits the response message 32-2 over the communication path (RCP) in the sixth time slot (TS-6). This process may be implemented with each additional remote locomotive power group 16.

Figure 4B:
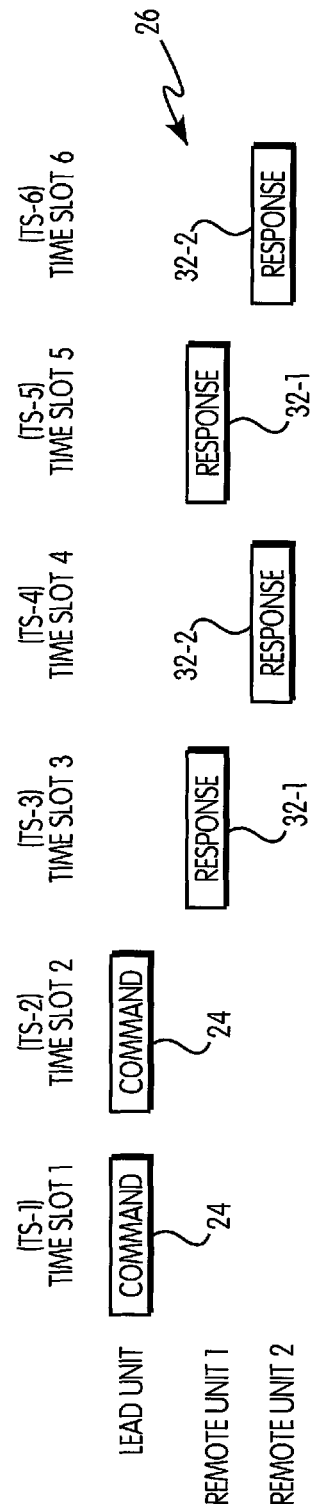
FIG. 4B is a TMDA chart illustrating another embodiment or aspect of a communication method for a train according to the principles of the present invention.

As illustrated in the TMDA chart in FIG. 4B, and in a further preferred and non-limiting embodiment or aspect implemented in connection with two remote locomotive power groups 16, the message exchange cycle 26 is as follows: (1) the first lead communication device 20 of the lead locomotive power group 14 transmits the command message 24 over the communication path (CCP-1) in the first time slot (TS-1); (2) the second lead communication device 22 of the lead locomotive power group 14 transmits the command message 24 over the communication path (CCP-2) in the second time slot (TS-2); (3) the first remote communication device 34 of the first remote locomotive power group 16 transmits its response message 32-1 over the communication path (RCP-1) in the third time slot (TS-3); (4) the first remote communication device 34 of the second remote locomotive power group 16 transmits its response message 32-2 over the communication path (RCP) in the fourth time slot (TS-4); (5) the second remote communication device 36 of the first remote locomotive power group 16 transmits the response message 32-1 over the communication path (RCP-2) in the fifth time slot (TS-5); and (6) the second remote communication device 36 of the second remote locomotive power group 16 transmits the response message 32-2 over the communication path (RCP) in the sixth time slot (TS-6). This process is implemented with each additional remote locomotive power group 16. Accordingly, this embodiment or aspect provides an interleaving communication scheme with respect to the first remote communication devices 34 and the second remote communication devices 36 of the first remote locomotive power group 16 and the second remote locomotive power group 16 (as well as additional remote locomotive power groups, if present).

In another preferred and non-limiting embodiment or aspect, the response message 26 includes identification data including the identification of the remote communication device (34, 36) from which the response message 32 is transmitted. Therefore, the lead locomotive computer 18 and/or the remote locomotive computer 28 can use the identification data in the response message 32 to identify whether and which remote communication device (34, 36) is actively transmitting data, is potentially inactive, has potentially failed, and/or the like. As discussed, the same analysis may occur using information related to which communication device (34, 36) is or should be transmitting in which time slot (e.g., time slots (TS-3-TS-6) in FIG. 4).

In a further preferred and non-limiting embodiment or aspect, the communication system 10 the lead locomotive computer 18 and/or the remote locomotive computer 28 is programmed, configured, or adapted to determine the status of the first lead communication device 20, the second lead communication device 22, the first remote communication device 34, and/or the second remote communication device 36 based at least partially on the content, timing, or other condition related to the response message 32. In addition, and with reference to FIG. 3, the lead locomotive computer 18 and/or the remote locomotive computer 28 is further programmed, configured, or adapted to generate or transmit at least one status message 38, which includes the identification of or content related to the status of the first lead communication device 20, the second lead communication device 22, the first remote communication device 34, and/or the second remote communication device 36. This status message 38 may be transmitted to at least one remote server 40, such as a remote central dispatch server, a remote computer, a remote controller system, and/or the like (and/or to the crew on an interface or visual display device in the locomotive in the lead locomotive power group 14). In one preferred and non-limiting embodiment or aspect, the remote server 40 is programmed, configured, or adapted to facilitate or implement specified communication actions (e.g., distribution of the status information within the railway system, generation of messages indicating the status of the components or communication devices of the train 12, and/or the like) or maintenance actions (e.g., populating a maintenance database for future repair of faulty or failed equipment, generation of messages requiring or scheduling the repair of faulty or failed components of devices, and/or the like). Of course, any of these communication or maintenance actions can occur locally on the train 12, such as on or by the lead locomotive computer 18.

In a further preferred and non-limiting embodiment or aspect, and as illustrated in FIG. 5, the remote locomotive computer 28 is programmed, configured, or adapted to: (a) generate at least one alarm message 42; and (b) transmit or cause the transmission of the at least one alarm message 42 from the remote communication device 30 (e.g., the first remote communication device 34, the second remote communication device 36, etc.) over a communication path (ALCP) (i.e., communication path (ALCP-1) from the first remote communication device 34 and communication path (ALCP-2) from the second remote communication device 36) in a predetermined time slot (e.g., time slot (TS-1)) in a message exchange cycle 44. Further, in another preferred and non-limiting embodiment or aspect, the lead locomotive computer 18 is programmed, configured, or adapted to directly or indirectly receive the alarm message 42 from each of the remote communication devices (30, 34, 36) via the first lead communication device 20 and/or the second lead communication device 22. In addition, the lead locomotive computer 18 is further programmed, configured, or adapted to: (c) generate at least one acknowledgement message 46; (d) transmit or cause the transmission of the acknowledgement message 46 from the first lead communication device 20 over a communication path (ACCP-1) in a predetermined time slot (e.g., time slot (TS-2) when communicating with only a single remote communication device 30 in the remote locomotive power group 15, or time slot (TS-3) when communicating with both the first remote communication device 34 and the second remote communication device 36) in the message exchange cycle 44, i.e., a time slot different than the predetermined time slot in the message exchange cycle 44 of transmission(s) in step (b); and (e) transmit or cause the transmission of the acknowledgement message 46 from the second lead communication device 22 over a communication path (ACCP-2) in a predetermined time slot (e.g., time slot (TS-3) when communicating with only a single remote communication device 30 in the remote locomotive power group 15, or time slot (TS-4) when communicating with both the first remote communication device 34 and the second remote communication device 36) in the message exchange cycle 44, i.e., a time slot different than the predetermined time slot in the message exchange cycle 44 of the transmissions in steps (b) and (d).

In a still further preferred and non-limiting embodiment or aspect, and as illustrated in the TDMA chart of FIG. 6, the communication system 10 includes both the first remote communication device 34 and the second remote communication device 36. In this embodiment or aspect, the remote locomotive computer 28 is programmed, configured, or adapted to: transmit or cause the transmission of the alarm message 42 from the first remote communication device 34 in a first predetermined time slot (TS-1) in the message exchange cycle 44; and transmit or cause the transmission of the alarm message 42 from the second remote communication device 36 in a second predetermined time slot (TS-2) in the message exchange cycle 44. With continued reference to the embodiment or aspect of FIG. 6, the lead locomotive computer 18 is further programmed, configured, or adapted to: generate at least one acknowledgement message 46; transmit or cause the transmission of the acknowledgement message 46 from the first lead communication device 20 in a third predetermined time slot (TS-3) in the message exchange cycle 44; and transmit or cause the transmission of the acknowledgement message 46 from the second lead communication device 22 in a fourth predetermined time slot (TS-4) in the message exchange cycle 44.

It should be noted that when using separate message exchange cycles 44 for each remote locomotive power group 16, the above-discussed TMDA chart (i.e., FIG. 6) applies to each additional remote locomotive power group 16. However, in another preferred and non-limiting embodiment or aspect, and when a single message exchange cycle 44 is used for all remote locomotive power groups 16, the predetermined time slots that are utilized will differ. Specifically, and with reference to one preferred and non-limiting embodiment or aspect, as illustrated in FIG. 7: the alarm message 42-1 from the first remote communication device 34 of the first remote locomotive power group 16 will be transmitted in the first predetermined time slot (TS-1); the alarm message 42-1 from the second remote communication device 36 of the first remote locomotive power group 16 will be transmitted in a second predetermined time slot (TS-2); the acknowledgement message 46-1 from the first lead communication device 20 will be transmitted in the third predetermined time slot (TS-3); the acknowledgement message 46-1 from the second lead communication device 22 will be transmitted in the fourth predetermined time slot (TS-4); the alarm message 42-2 from the first remote communication device 34 of the second remote locomotive power group 16 will be transmitted in the fifth predetermined time slot (TS-5); the alarm message 42-2 from the second remote communication device 36 of the second remote locomotive power group 16 will be transmitted in a sixth predetermined time slot (TS-6); the acknowledgement message 46-2 from the first lead communication device 20 will be transmitted in the seventh predetermined time slot (TS-7); and the acknowledgement message 46-2 from the second lead communication device 22 will be transmitted in the eighth predetermined time slot (TS-8). This methodology may be used for each additional remote locomotive power group 16.

In one preferred and non-limiting embodiment or aspect, the acknowledgement message (46, 46-1, 46-2) from the first lead communication device 20 and/or the second lead communication device 22 includes acknowledgement data (i.e., an acknowledgement of the receipt of the alarm message 42) and lead identification data that at least partially represents: an identification of the remote communication device (34, 36) from which the alarm message 42 (from each remote locomotive power group 16) was received; and an identification of the remote communication device (20, 22) from which the acknowledgement message (46, 46-1, 46-2) is transmitted. Further, the alarm message (42, 42-1, 42-2) includes alarm condition data (e.g., alarm information, operating data, condition data, information regarding the status or condition of any of the equipment or components of the remote locomotive power group 16, safety information and data, and/or the like) and remote identification data that at least partially represents an identification of the first remote communication device 34 or the second remote communication device 36 (e.g., an identification of the remote communication device (34, 36) that is transmitting).

In another preferred and non-limiting embodiment or aspect, the lead locomotive computer 18 and/or the remote locomotive computer 28 is programmed, configured, or adapted to determine that status of the remote communication device 30, the first remote communication device 34, the second remote communication device 36, the first lead communication device 20, and/or the second lead communication device 22 based at least partially on the content, timing, or other condition related to the alarm message 42 and/or the acknowledgement message 46. Further, a status message 38 can be generated, transmitted, and/or utilized relating to this determined status using the process discussed above.

In another preferred and non-limiting embodiment or aspect, provided is a computer-implemented communication method for a train 12 having a lead locomotive power group 14 including at least one locomotive with a lead locomotive computer 18 in communication with a first lead communication device 20 and a second lead communication device 20, and at least one remote locomotive power group 16 including at least one locomotive with at least one remote locomotive computer 28 in communication with at least one remote communication device 30. The method includes: (i) generating, by the lead management computer 18, at least one command message 24; (ii) transmitting, or causing the transmission, by the lead management computer 18, of the at least one command message 24 from the first lead communication device 20 in a predetermined time slot in a message exchange cycle 26; (iii) transmitting, or causing the transmission, by the lead management computer 18, of the at least one command message 24 from the second lead communication device 22 in a predetermined time slot in the message exchange cycle 26 different than the predetermined time slot in the message exchange cycle 26 of the transmission in step (ii); and (iv) directly or indirectly receiving the at least one command message 24 by the at least one remote locomotive computer 28 from at least one of the first lead communication device 20 and the second lead communication device 22 via the at least one remote communication device 30.

In another preferred and non-limiting embodiment or aspect, the method further includes: generating, by the at least one remote locomotive computer 28, at least one response message 32; and transmitting, or causing the transmission, by the at least one remote locomotive computer 28, of the at least one response message 32 from the at least one remote communication device 30. In another preferred and non-limiting embodiment or aspect, the method includes: generating, by the at least one remote locomotive computer 28, at least one alarm message 42; and transmitting, or causing the transmission, by the at least one remote locomotive computer 28, of the at least one alarm message 42 from the at least one remote communication device 30. In a further preferred and non-limiting embodiment or aspect, the method includes: generating, by the lead locomotive computer 18, at least one acknowledgement message 46; and transmitting, or causing the transmission, by the lead locomotive computer 18, of the at least one acknowledgement message 46 from at least one of the first lead communication device 20 and the second lead communication device 22.

In one preferred and non-limiting embodiment or aspect, the method further includes identifying the communication device 20, 22, 30, 34, 36 from which a message is transmitted or received based at least partially on the content of at least one message exchanged between the lead locomotive computer 18 and the at least one remote locomotive computer 28. In another preferred and non-limiting embodiment or aspect, the method includes identifying the communication device 20, 22, 30, 34, 36 from which a message is transmitted or received based at least partially on the time slot in the message exchange cycle, timing, or order associated with at least one message exchanged between the lead locomotive computer 18 and the at least one remote locomotive computer 28.

In a further preferred and non-limiting embodiment or aspect, the method includes determining a status of at least one communication device 20, 22, 30, 34, 36 based at least partially on the content of at least one message exchanged between the lead locomotive computer 18 and the at least one remote locomotive computer 28, and in another embodiment or aspect, determining a status of at least one communication device 20, 22, 30, 34, 36 from which a message is transmitted or received based at least partially on the time slot in the message exchange cycle, timing, or order associated with at least one message exchanged between the lead locomotive computer 18 and the at least one remote locomotive computer 28.

In a further preferred and non-limiting embodiment or aspect, the method includes: generating, by at least one of the lead locomotive computer 18 and the at least one remote locomotive computer 28, at least one status message 38; and transmitting, or causing the transmission, by at least one of the lead locomotive computer 18 and the at least one remote locomotive computer 28, of the at least one status message 38 to at least one remote server 40 (and/or to the crew on an interface or visual display device in the locomotive in the lead locomotive power group 14). The status message 38 may include the status or condition of at least one communication device 20, 22, 30, 34, 36.

In one exemplary and non-limiting embodiment or aspect, the communication system 10 improves on the existing communications scheme by expanding the available time slots in a message exchange cycle, and allocating adjacent time slots in the protocol for each redundant transceivers (e.g., communication device) of a locomotive power group (or unit). As the modulation rate is fairly fast, introducing additional time slots will not adversely impact the system operation. In this exemplary embodiment or aspect, the first two time slots in the protocol will be assigned to the lead locomotive power group 14 (or unit), with the lead unit transmitting from the first lead communication device 20 (in this case a radio transceiver) in the first time slot, and transmitting from the second lead communication device 22 (in this case, a radio transceiver) in the second time slot. Each command message 24 will have an indicator of which lead communication device 20, 22 is being used for the current transmission. The third and fourth time slots will be assigned to the first remote locomotive power group 16 (or unit), with the remote locomotive power group 16 transmitting from the first remote communication device 34 (in this case, a radio transceiver) in the third time slot, and transmitting from second remote communication device 36 (in this case, a radio transceiver) in the fourth time slot. This methodology/process is implemented for additional remote locomotive power groups 16 (or units). In this exemplary embodiment or aspect, each response message 32 from each remote locomotive power group 16 will include an indication of which lead communication device 20, 22 a command message 24 was received, which remote communication device 34, 36 received the command message 24, and an indicator of which remote communication device 34, 26 is being used for transmitting the response message 32.

In this exemplary embodiment or aspect, and in the nominal case when all communication devices 20, 22, 30, 34, 36 are working properly, and have an appropriate radio frequency signal (i.e., communication) path between them, the communication system 10 response time is unchanged from the existing implementation, since all remote locomotive power groups 16 will receive the first command message sent in the first time slot, and react accordingly. The acknowledgement time for the lead locomotive power group 14 to receive responses from all of the remote locomotive power groups 16 increases slightly, due to the redundant time slots for each remote locomotive power group 16; however, this increase will not impact system operation, and is expected to be under one second for a typical system configuration of one lead locomotive power group 14 (or unit) and two remote locomotive power groups 16 (or units).

In this exemplary embodiment or aspect, and in the case of a remote locomotive power group 16 (or unit) sending an alarm message 42, the same basic methodology is implemented, but in reverse, with the first and second time slots being used for the alarm message 42, and the third and fourth time slots being used for the acknowledgement message 46. When the appropriate version of the alarm protocol is advertised and accepted, the first two time slots in the alarm protocol will be assigned to the remote locomotive power group 16 (or unit) generating the alarm, and transmitting from the first remote communication device 34 in the first time slot, and transmitting from the second remote communication device 36 in the second time slot. Each alarm message 42 will have an indicator of which remote communication device 34, 36 is being used for the current transmission. The third and fourth time slots will be assigned to the acknowledgement protocol of the lead locomotive power group 14 (or unit), with the first lead communication device 20 transmitting in the third time slot, and the second lead communication device 22 transmitting in the fourth time slot.

In this manner, and in the event of a communication device 20, 22, 30, 34, 36 failure (or radio signal path interruption on one channel), the communication system response time is greatly improved, reducing the response time from up to about 20 seconds to less than about 1 second. This represents both a system performance improvement and a safety improvement (e.g., preventing adverse situations as a result of the delay in power group control of the existing system). As an additional benefit of the implementation of the above-described communication system 10 and method, run-time diagnostics are possible to identify a bad communication device 20, 22, 30, 34, 36 before it adversely impacts system operation. For example, and as discussed above, a warning or status message can be displayed to the crew to indicate that service is required when a transceiver has failed and system redundancy has been lost.

In this manner, the present invention provides an improved communication system and method for a train.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A communication system comprising:
a lead computer configured to be onboard a lead vehicle power group and in communication with a first lead communication device and a second lead communication device; and
a remote computer configured to be onboard a remote vehicle power group of a vehicle system that includes the lead vehicle power group and at least the remote vehicle power group, the remote computer configured to be in communication with a first remote communication device and a second remote communication device, wherein the lead computer is configured to communicate a command message from the first lead communication device to the first remote communication device during a first predetermined time slot in a message exchange cycle and communicate the command message from the second lead communication device to the second remote communication device in a subsequent, second predetermined time slot in the message exchange cycle, wherein the remote computer is configured to receive the command message from at least one of the first lead communication device or the second lead communication device via the first remote communication device or the second remote communication device,
wherein the remote computer is configured to communicate a response message to the lead computer in an interleaving process by communicating the response message from the first remote communication device to at least one of the first lead communication device or the second lead communication device during a third time slot that is subsequent to the second time slot in the message exchange cycle, communicating the response message from the second remote communication device to the at least one of the first lead communication device or the second lead communication device during a fourth time slot that is subsequent to the third time slot in the message exchange cycle, communicating the response message from the first remote communication device to the at least one of the first lead communication device or the second lead communication device during a fifth time slot that is subsequent to the fourth time slot in the message exchange cycle, and communicating the response message from the second remote communication device to the at least one of the first lead communication device or the second lead communication device during a sixth time slot that is subsequent to the fifth time slot in the message exchange cycle.

2. The communication system of claim 1, wherein the lead computer is configured to receive the response message from at least one of the first remote communication device or the second remote communication device via at least one of the first lead communication device or the second lead communication device.

3. The communication system of claim 1, wherein the command message comprises control data and identification data of the first lead communication device or the second lead communication device.

4. The communication system of claim 3, wherein the response message comprises lead identification data based at least in part on the lead identification data and identifying the first lead communication device or the second lead communication device from which the command message was received.

5. The communication system of claim 4, wherein the response message also comprises remote identification data that identifies the first remote communication device or the second remote communication device from which the response message is communicated.

6. The communication system of claim 1, wherein at least one of the lead computer or the remote computer is configured to determine a status of at least one of the first lead communication device or the second lead communication device based at least partially on the response message.

7. The communication system of claim 6, wherein at least one of the lead computer or the remote computer is configured to communicate a status message that includes an identification of the status of the at least one of the first lead communication device or the second lead communication device.

8. The communication system of claim 7, wherein one or more of the first lead communication device, the second lead communication device, the first remote communication device, or the second remote communication device is configured to communicate the status message to at least one of a remote server, an interface on the vehicle system, or a visual display device on the vehicle system.

9. The communication system of claim 1, wherein at least one of the lead computer or the remote computer is configured to determine a status of at least one of the first remote communication device or the second remote communication device based at least partially on the response message.

10. The communication system of claim 9, wherein at least one of the lead computer or the remote computer is configured to communicate a status message that includes an identification of the status of the at least one of the first remote communication device or the second remote communication device.

11. The communication system of claim 10, wherein one or more of the first lead communication device, the second lead communication device, the first remote communication device, or the second remote communication device is configured to communicate the status message to at least one of a remote server, an interface on the vehicle system, or a visual display device on the vehicle system.

12. The communication system of claim 1, wherein the remote computer is configured to communicate an alarm message from one or more of the first remote communication device or the second remote communication device in the message exchange cycle.

13. The communication system of claim 12, wherein the lead computer is configured to receive the alarm message from the one or more of the first remote communication device or the second remote communication device via at least one of the first lead communication device or the second lead communication device.

14. The communication system of claim 12, wherein the lead computer is further configured to communicate an acknowledgement message from the first lead communication device in a seventh time slot in the message exchange cycle and communicate the acknowledgement message from the second lead communication device in an eighth time slot in the message exchange cycle.

15. The communication system of claim 12, wherein the first remote communication device is configured to communicate the alarm message in a seventh time slot in the message exchange cycle and the second remote communication device is configured to communicate the alarm message in an eighth time slot in the message exchange cycle.

16. The communication system of claim 15, wherein the lead computer is configured to communicate an acknowledgement message from the first lead communication device in a ninth time slot in the message exchange cycle and communicate the acknowledgement message from the second lead communication device in a tenth time slot in the message exchange cycle.

17. The communication system of claim 16, wherein the acknowledgement message comprises acknowledgement data and lead identification data that at least partially represents an identification of the first remote communication device or the second remote communication device from which the alarm message was received and the acknowledgement message comprises an identification of the first remote communication device or the second remote communication device from which the acknowledgement message is communicated.

18. The communication system of claim 16, wherein the alarm message comprises alarm condition data and remote identification data that identifies the first remote communication device or the second remote communication device.

19. The communication system of claim 16, wherein at least one of the lead computer or the remote computer is configured to determine a status of at least one of the first remote communication device, the second remote communication device, the first lead communication device, or the second lead communication device based at least partially on at least one of the alarm message or the acknowledgement message.

20. The communication system of claim 1, wherein the remote vehicle power group is one of plural remote vehicle power groups in the vehicle system.

21. A method comprising:
communicating a command message during a first time slot in a message exchange cycle from a first lead communication device of a lead computer onboard a lead vehicle power group in a vehicle system;
communicating the command message during a subsequent, second time slot in the message exchange cycle from a second lead communication device of the lead computer;
receiving the command message at one or more of a first remote communication device or a second remote communication device of a remote computer onboard a remote vehicle power group in the vehicle system; and
communicating a response message to the lead computer in an interleaving process by communicating the response message from the first remote communication device to at least one of the first lead communication device or the second lead communication device during a third time slot that is subsequent to the second time slot in the message exchange cycle, communicating the response message from the second remote communication device to the at least one of the first lead communication device or the second lead communication device during a fourth time slot that is subsequent to the third time slot in the message exchange cycle, communicating the response message from the first remote communication device to the at least one of the first lead communication device or the second lead communication device during a fifth time slot that is subsequent to the fourth time slot in the message exchange cycle, and communicating the response message from the second remote communication device to the at least one of the first lead communication device or the second lead communication device during a sixth time slot that is subsequent to the fifth time slot in the message exchange cycle.

22. The method of claim 21, wherein the response message is received by at least one of the first lead communication device or the second lead communication device from at least one of the first remote communication device or the second remote communication device.

23. The method of claim 21, wherein the command message comprises control data and identification data of the first lead communication device or the second lead communication device.

24. The method of claim 23, wherein the response message comprises lead identification data based at least in part on the lead identification data and identifying the first lead communication device or the second lead communication device from which the command message was received.

25. The method of claim 24, wherein the response message also comprises remote identification data that identifies the first remote communication device or the second remote communication device from which the response message is communicated.

26. The method of claim 21, further comprising:
determining a status of at least one of the first lead communication device or the second lead communication device based at least partially on the response message.

27. The method of claim 26, further comprising:
communicating a status message that includes an identification of the status of the at least one of the first lead communication device or the second lead communication device.

28. The method of claim 27, further comprising:
communicating the status message from one or more of the first lead communication device, the second lead communication device, the first remote communication device, or the second remote communication device to at least one of a remote server, an interface on the vehicle system, or a visual display device on the vehicle system.

29. The method of claim 27, further comprising:
determining a status of at least one of the first remote communication device or the second remote communication device based at least partially on the response message.

30. A communication system comprising:
a lead computer configured to be onboard a lead vehicle and in communication with a first lead communication device and a second lead communication device; and
a remote computer configured to be onboard a remote vehicle of a vehicle system that includes the lead vehicle and at least the remote vehicle, the remote computer configured to be in communication with a first remote communication device and a second remote communication device, wherein the lead computer is configured to communicate a command message from the first lead communication device to the first remote communication device during a first predetermined time slot in a message exchange cycle and communicate the command message from the second lead communication device to the second remote communication device in a subsequent, second predetermined time slot in the message exchange cycle, wherein the remote computer is configured to receive the command message from at least one of the first lead communication device or the second lead communication device via the first remote communication device or the second remote communication device,
wherein the remote computer is configured to communicate a response message to the lead computer in an interleaving process by communicating the response message from the first remote communication device to at least one of the first lead communication device or the second lead communication device during a third time slot that is subsequent to the second time slot in the message exchange cycle, communicating the response message from the second remote communication device to the at least one of the first lead communication device or the second lead communication device during a fourth time slot that is subsequent to the third time slot in the message exchange cycle, communicating the response message from the first remote communication device to the at least one of the first lead communication device or the second lead communication device during a fifth time slot that is subsequent to the fourth time slot in the message exchange cycle, and communicating the response message from the second remote communication device to the at least one of the first lead communication device or the second lead communication device during a sixth time slot that is subsequent to the fifth time slot in the message exchange cycle.

* * * * *